United States Patent
Nakagawa et al.

(10) Patent No.: US 8,845,011 B2
(45) Date of Patent: Sep. 30, 2014

(54) NUMBER PLATE MOUNTING STRUCTURE IN MOTORCYCLE

(71) Applicant: Kawasaki Jukogyo Kabushiki Kaisha, Hyogo (JP)

(72) Inventors: Kenichi Nakagawa, Kobe (JP); Norikazu Matsumura, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 14/098,364

(22) Filed: Dec. 5, 2013

(65) Prior Publication Data

US 2014/0175836 A1    Jun. 26, 2014

(30) Foreign Application Priority Data

Dec. 25, 2012  (JP) .................................. 2012-280905

(51) Int. Cl.
*B62D 25/08*  (2006.01)
*B62K 11/00*  (2006.01)

(52) U.S. Cl.
CPC ..................................... *B62K 11/00* (2013.01)
USPC .................................... 296/193.09; 296/78.1

(58) Field of Classification Search
CPC ............................ B62K 2202/00; B62J 17/02
USPC .......................... 296/193.09, 78.1; 180/68.1
IPC ..................................................... B62D 25/08
See application file for complete search history.

(56) References Cited

U.S. PATENT DOCUMENTS

| | | | | |
|---|---|---|---|---|
| 5,490,573 A | * | 2/1996 | Hagiwara et al. | ............ 180/68.1 |
| 7,798,509 B2 | * | 9/2010 | Ohzono | ................... 280/152.05 |
| 8,534,406 B2 | * | 9/2013 | Nakajin et al. | ................. 180/219 |
| 2005/0174787 A1 | * | 8/2005 | Uemoto et al. | ................ 362/473 |
| 2008/0156559 A1 | * | 7/2008 | Kitamura | ...................... 180/219 |
| 2008/0158896 A1 | * | 7/2008 | Mochizuki | ..................... 362/473 |

FOREIGN PATENT DOCUMENTS

JP         05-238457         7/1993

* cited by examiner

*Primary Examiner* — Pinel Romain

(57) ABSTRACT

A motorcycle includes a front fender, which overhangs a front wheel, and a number plate which is disposed forwardly of a handlebar. A center portion of the front fender with respect to a widthwise direction is formed with a longitudinal groove that is recessed downwardly to represent a tapered shape and a lower end edge of the number plate is tapered enough to allow it to be engaged in the longitudinal groove. A projection is provided in an upper surface of the front fender and an engagement hole engageable with the projection is provided in the number plate.

4 Claims, 8 Drawing Sheets

NUMBER PLATE MOUNTING STRUCTURE IN MOTORCYCLE

CROSS REFERENCE TO THE RELATED APPLICATION

This application is based on and claims Convention priority to Japanese patent application No. 2012-280905, filed Dec. 25, 2012, the entire disclosure of which is herein incorporated by reference as a part of this application.

BACKGROUND OF THE INVENTION

1. Field of the Invention

The present invention relates to a racing motorcycle that is driven in a racing circuit.

2. Description of Related Art

In this type of motorcycle, it is quite often that a front fender for overhanging a front wheel and a number plate such as, for example, a racing number plate positioned forwardly of a steering handle are mounted on the motorcycle separately. In this structure, a gap tends to be formed between an upper surface of the front fender and a lower end of the number plate and, therefore, not only is the aesthetic appearance deteriorated, but also muddy water is apt to ingress through such gap. Accordingly, suggestion has been made in, for example, the JP Laid-open Patent Publication No. H05-238457 that a projection and an engagement holes are formed respectively in the lower end of the number late and the upper surface of the front fender so that the upper surface of the front fender and a lower portion of the number plate may be connected together.

It has however been found that in the motorcycle of a kind disclosed in the above described patent document, the muddy water often ingresses into the engagement hole, formed in the upper surface of the front fender, although formation of the gap between the upper surface of the front fender and the lower end of the number plate is suppressed.

SUMMARY OF THE INVENTION

The present invention has been devised to substantially eliminate the above described problems and inconveniences and is intended to provide a motorcycle in which while formation of the gap between the upper surface of the front fender and the lower end of the number plate is suppressed, an undesirable ingress of the muddy water is prevented.

In order to accomplish the foregoing object of the present invention, there is provided, in accordance with the present invention, a motorcycle provided with a front fender, which overhangs a front wheel, and a number plate disposed forwardly of a handlebar. In this motorcycle, a longitudinal groove formed at a center portion of the front fender with respect to a widthwise direction or leftward and rightward directions and recessed to taper downwardly. The number plate has a lower end edge, at least a portion of the lower end edge being so formed as to represent a tapered shape enough to allow that portion of the lower end edge to engage in. A projection is provided in an upper surface of the front fender, and an engagement hole engageable with the projection is provided in the number plate.

According to the above described construction, since the projection on the upper surface of the front fender and the engagement hole in the number plate are engaged with each other, no gap is formed between the upper surface of the front fender and the lower end of the number plate. Also, since the projection, not an engagement hole, is formed in the upper surface of the front fender, there is no possibility that muddy water may pass through the front fender to ingress. In addition, since the lower end edge of the number plate is easily positioned leftwards or rightwards having been guided by the longitudinal groove in the front fender, the engagement between the number plate and the front fender is easily accomplished.

In a preferred embodiment of the present invention, the longitudinal groove in the front fender is preferably of a triangular sectional shape, in which case the lower end edge of the number plate is correspondingly triangular in shape. According to this structural feature, since the longitudinal groove in the front fender is easily engaged with the lower end edge of the number plate, guiding of the number plate to a desired position is smoothly accomplished. It is to be noted that the term "section (or sectional)" referred to above and hereinafter means a section taken perpendicular to a longitudinal direction (anteroposterior direction) of the front fender.

In another preferred embodiment of the present invention, the lower end edge of the number plate is preferably formed with a flange extending rearwardly to be connected with an upper surface of the front fender, in which case the engagement hole is formed in this flange. According to this structural feature, since the number plate is brought into surface contact with the front fender, the number plate is stabilized.

In a further preferred embodiment of the present invention, the projection and the engagement hole, both referred to above, are preferably provided in respective pairs on left and right sides. According to this structural feature, the position of the number plate relative to the front fender is stabilized by means of the engagement at two locations.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1:
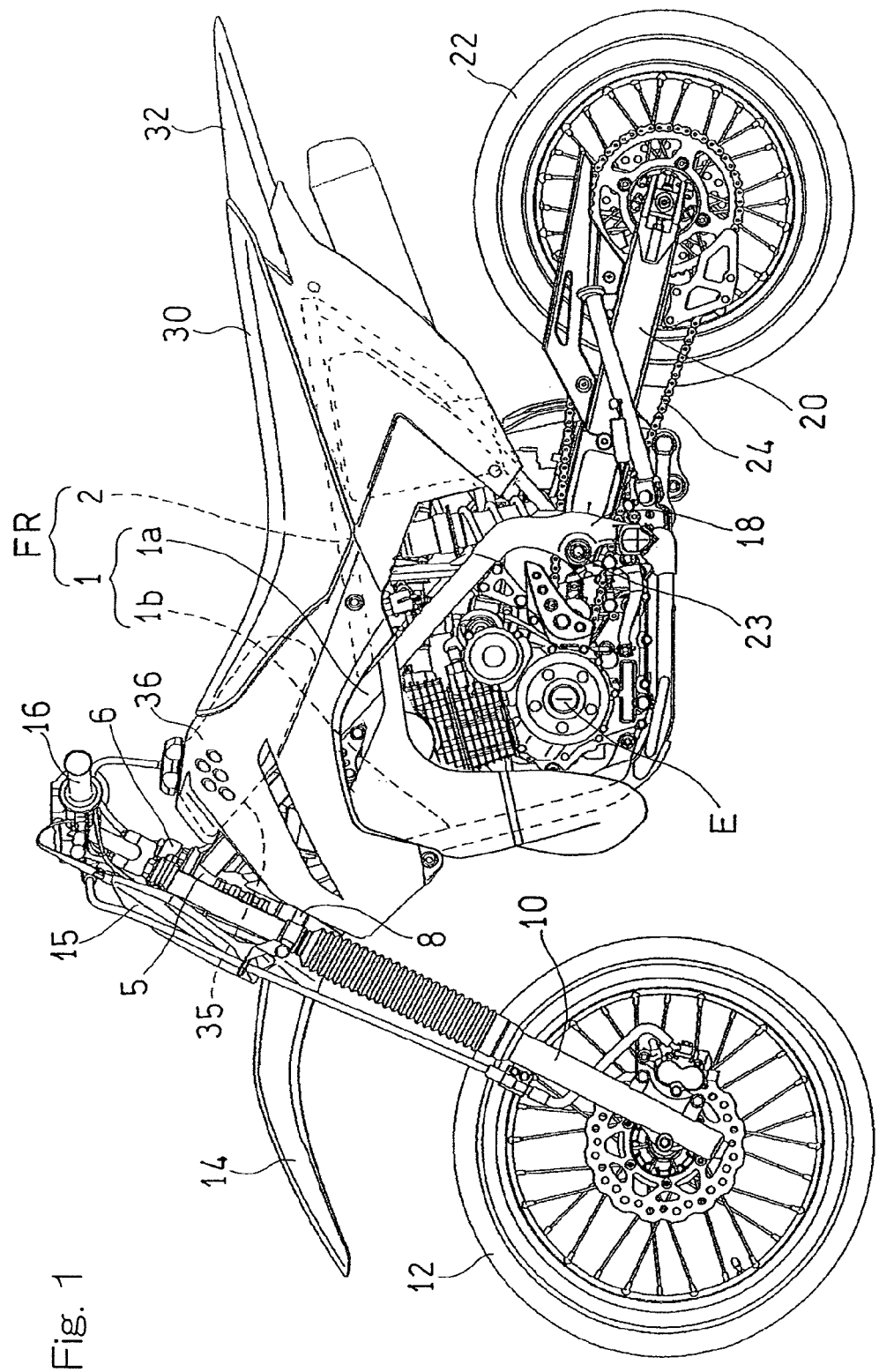
FIG. 1 is a side view showing a motorcycle according to a preferred embodiment of the present invention.

A preferred embodiment of the present invention will be described in detail with reference to the accompanying drawings. It is, however, to be noted that the terms "left" and "right" used hereinabove and hereinafter are relative terms to denote opposite positions or directions, respectively, as viewed by a motorcycle rider or motorist then occupying a motorcycle rider's seat and looking forwards in a direction parallel to the longitudinal sense of the motorcycle. FIG. 1 illustrates a side view of the motorcycle embodying the present invention. It is also to be noted that the motorcycle according to this embodiment is of a type suited for running on a rough or irregular road such as, for example, a mountain road or a racing circuit.

The illustrated motorcycle has a motorcycle frame structure FR made up of a main frame substructure 1 and a rear frame substructure 2 connected with the main frame substructure 1 so as to form a rear frame assembly. The main frame substructure 1 includes an upper main frame 1a, extending diagonally downwardly and rearwardly above a motorcycle combustion engine E, and a lower main frame 1b which extends forwardly of the combustion engine E in a direction downwardly thereof and is then rigidly connected with a rear end of the upper main frame 1a. A head pipe 5 is fitted to a front end portion of the main frame substructure 1 with an upper bracket 6 and an under bracket 8 mounted thereon through a pivotally supported steering shaft (not shown) for pivotal movement together therewith, and a front fork assembly 10 has its upper portion supported by the upper bracket 6 and the under bracket 8.

A front wheel 12 is rotatably supported by a lower end portion of the front fork assembly 10 and a front fender 14, made of a resinous material, is fitted to the under bracket 8 at a location above the front wheel 12. A steering handle 16 is fitted to the upper bracket 6 that is rigid or fast with the upper end portion of the front fork assembly 10. A number plate 15 such as, for example, a motorcycle racer's number plate is fitted forwardly of the front fork assembly 10 and above the front fender 14.

A swingarm bracket 18 is provided at a rear end portion of the upper main frame 1a, and a swingarm 20 is supported by this swingarm bracket 18 through a pivot pin 23, which is inserted in a front end portion of the swingarm bracket 18, for movement up and down about such pivot pin 23. A rear wheel 22 is supported by a rear end portion of the swingarm 20. A combustion engine E is disposed intermediate between the upper main frame 1a and the lower main frame 1b, and this combustion engine E drives the rear wheel 22 through a drive transmission mechanism 24 such as, for example, a substantially endless chain.

The rear frame substructure 2 has a rider's seat 30 supported thereby, and a rear fender 32 made of a resinous material is fitted rearwardly of the rider's seat 30 and above the rear wheel 22. A fuel tank 35 is fitted to an upper portion of the upper main frame 1a, that is, in an upper region of the motorcycle frame structure FR and between the steering handle 16 and the rider's seat 30. A shroud 36 extending from a region rearwardly of the head pipe 5 to a region below a front portion of the rider's seat 30 is fitted to the motorcycle frame structure FR, and the fuel tank 35 referred to above is covered by an upper portion of the shroud 36.

Figure 2:
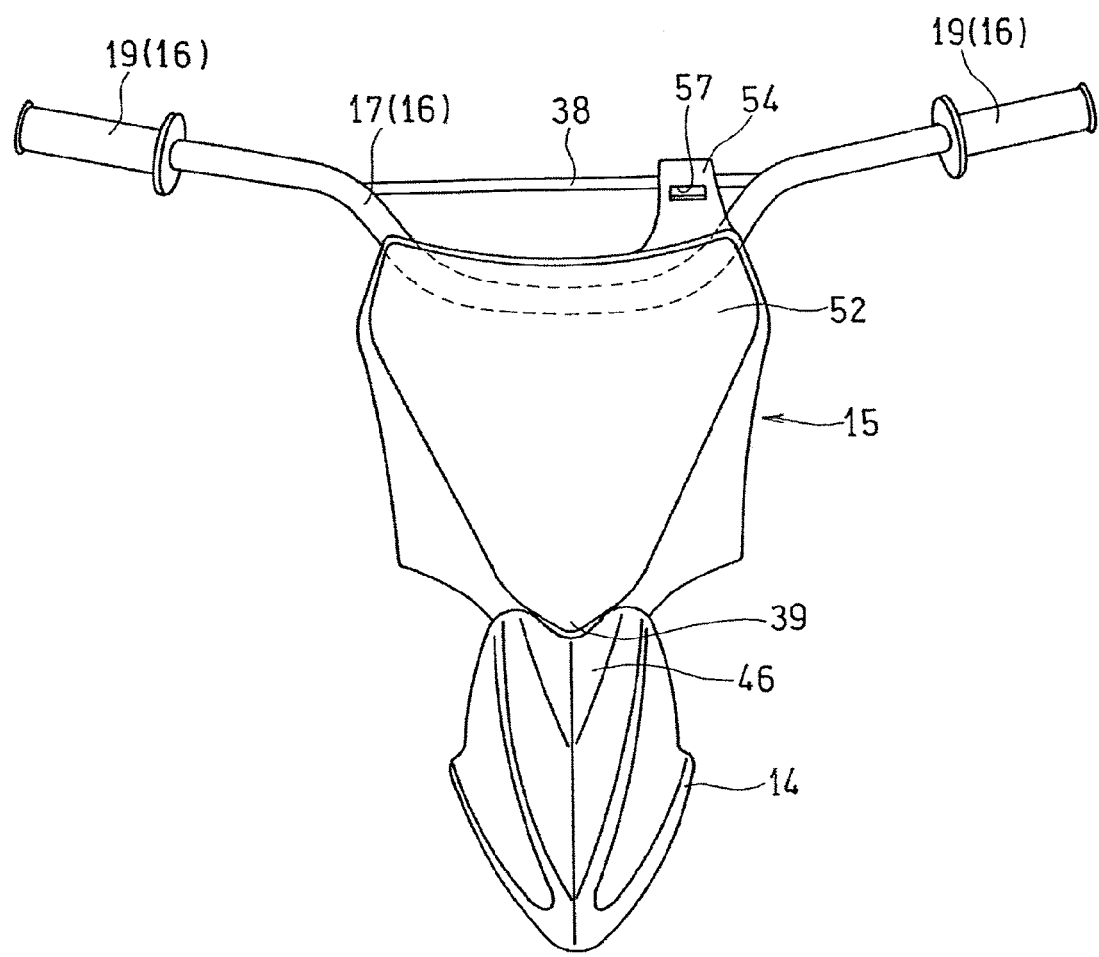
FIG. 2 is a perspective view showing a front portion of the motorcycle as viewed from diagonally above.

As shown in FIG. 2 illustrating a perspective view of the front portion of the motorcycle as viewed from diagonally above, the steering handle 16 referred to above is comprised of a single handlebar 17, having its opposite ends raised upwardly relative to an intermediate portion thereof, and left and right grips 19 mounted on the respective ends of the handlebar 17. The handlebar 17 is provided with a reinforcement bar 38 which is a rod-like member extending in leftward and rightward directions so as to bridge the concave intermediate portion of the handlebar 17. The reinforcement bar 38 has its opposite end portions fixed to the handlebar 17 by means of, for example, welding. The number plate 15 has a lower end edge 39 held in contact with an upper surface of the front fender 14, and the number plate 15 and the front fender 14 are positioned and engaged relative to each other by means of an engagement structure as will be described later.

Figure 3:
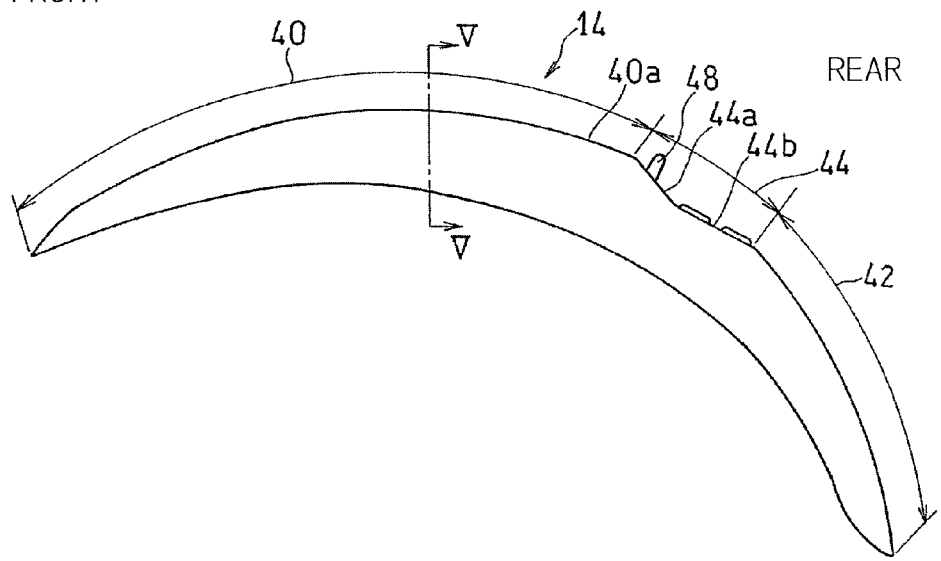
FIG. 3 is a side view showing a front fender of the motorcycle on an enlarged scale.
Figure 4:
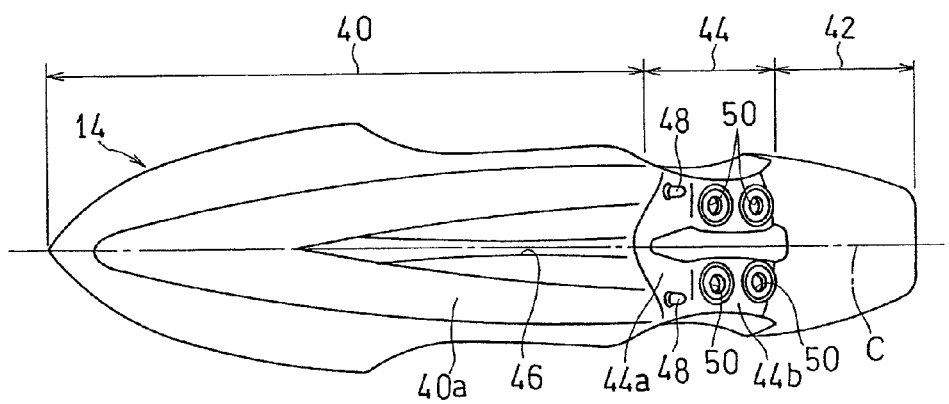
FIG. 4 is a top plan view showing the front fender shown in FIG. 3.

FIGS. 3 and 4 illustrate side and top plan views showing the front fender 14, respectively. The front fender 14 is made up of a fender front portion 40, a fender rear portion 42, and a to-be-supported portion 44 formed between the fender front portion 40 and the fender rear portion 42. The fender front portion 40 is positioned forwardly of the front fork assembly 10 so as to overhang an upper portion of the front wheel 12 and the fender rear portion 42 is positioned rearwardly of the front fork assembly 10 so as to overhang a rear upper portion of the front wheel 12.

Figure 5:
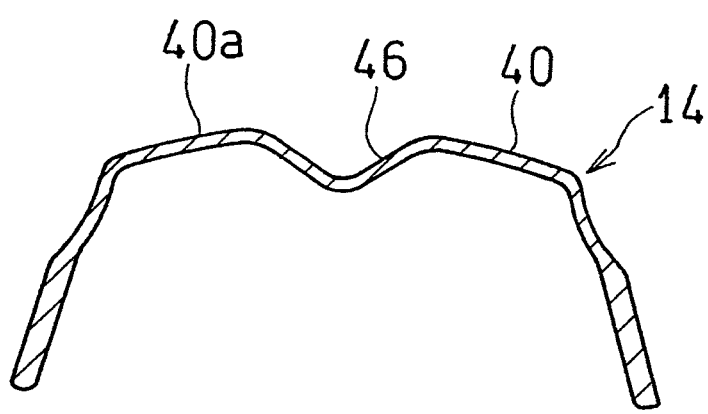
FIG. 5 is a cross sectional view taken along the line V-V in FIG. 3.

As shown in FIG. 4, at a center portion of an upper surface 40a of the fender front portion 40 in a direction parallel to the widthwise direction of the motorcycle (leftward and rightward directions), a longitudinal groove 46 is formed so as to extend forwardly from a rear end of the fender front portion 40. This longitudinal groove 46 is, as best shown in FIG. 5, of a triangular sectioned shape recessed so as to taper downwardly.

The to-be-supported portion 44, shown in FIG. 3, has an upper surface made up of a first inclined surface area 44a, which extends and diagonally downwardly and rearwards from a rear end of the upper surface 40a of the fender front portion 40, and a second inclined surface area 44b which extends diagonally downwardly and rearwards from a rear end of the first inclined surface area 44a at an angle, with respect to a horizontal plane, smaller than that of the first inclined surface area 44a.

An upwardly extending projection 48 is provided in the first inclined surface area 44a which is a portion of an upper surface of the front fender 14. As best shown in FIG. 4, the projection 48 is provided in a pair, and the pair of those projections 48 are disposed symmetrically with respect to a longitudinal center line C of the front fender 14 and are juxtaposed relative to each other. A region of the to-be-supported portion 44 of the front fender 14, where the second inclined surface area 44b is formed, is provided with four bolt insertion holes 50 that are open in a up and down direction, that is, a vertical direction.

Figure 6:
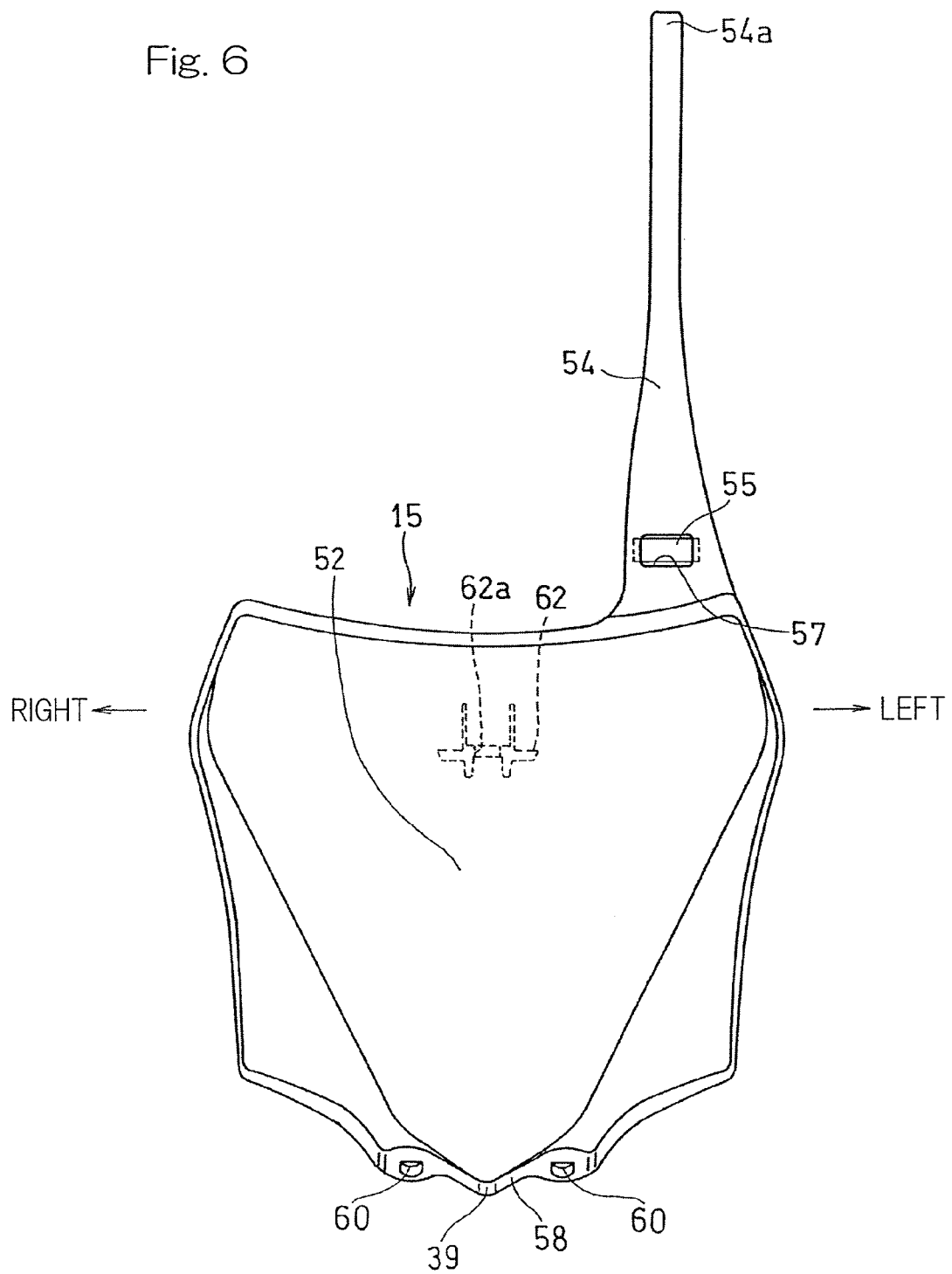
FIG. 6 is a front elevational view showing a number plate of the motorcycle.
Figure 8:
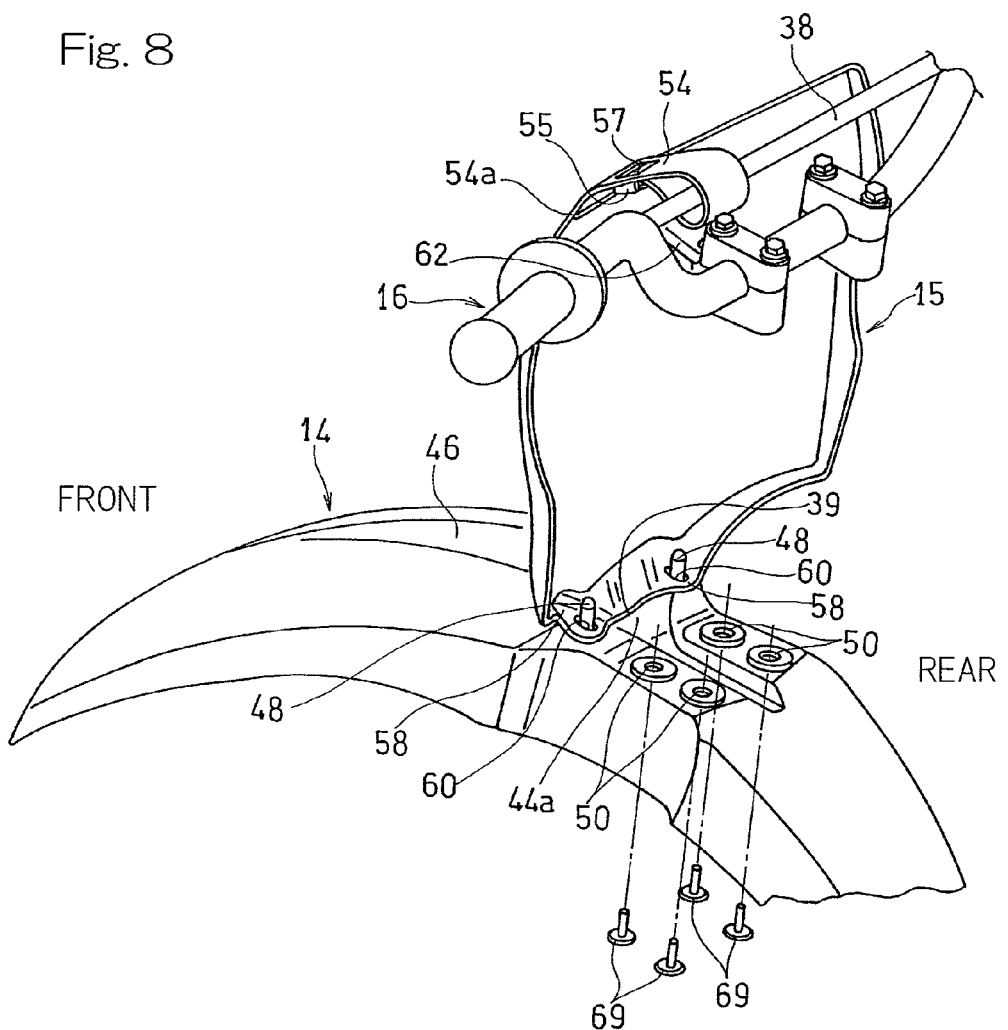
FIG. 8 is a perspective view showing the front portion of the motorcycle as viewed from diagonally above and rear of the motorcycle.

Referring to FIG. 6, the number plate 15 is made up of a number plate mounting area 52, where a number plate is fitted during a racing, and a flexible band 54, which extends upwardly from an upper end portion of the number plate mounting area 52. At a rear surface (back surface) of a base portion that is a lower end portion of the band 54, an engagement portion 55 of a slit shape, with which a tip end portion 54a of the band 54 then bent is engaged, is formed. The engagement portion 55 is, as best shown in FIG. 8, in the form of a U-shaped member protruding from a rear surface of the number plate 15 and is adapted to be engaged with the engagement portion 55 with the tip end portion 54a passed through a clearance that is formed between the engagement portion 55 and the rear surface of the number plate 15. The base portion of the band 54 is formed with an open window 57 through which the engagement between the tip end portion 54a and the engagement portion 55 can be viewed with naked eyes.

The lower end edge 39 of the number plate 15 shown in FIG. 2 is so shaped as to taper so that the lower end edge 39 can be engaged in the longitudinal groove 46 in the front fender 14. More specifically, the lower end edge 39 of the number plate 15 is so shaped as to represent a triangular shape in correspondence with the longitudinal groove 46 of the triangular sectional shape as described previously.

As shown in FIG. 6, the lower end edge 39 of the number plate 15 is formed with a flange 58 in the form of an inclined plate that extends diagonally rearwardly and downwardly. This flange 58 has a pair of engagement holes 60 defined therein so as to open substantially in the vertical direction on left and right sides of the lower end edge 39, respectively.

Figure 9:
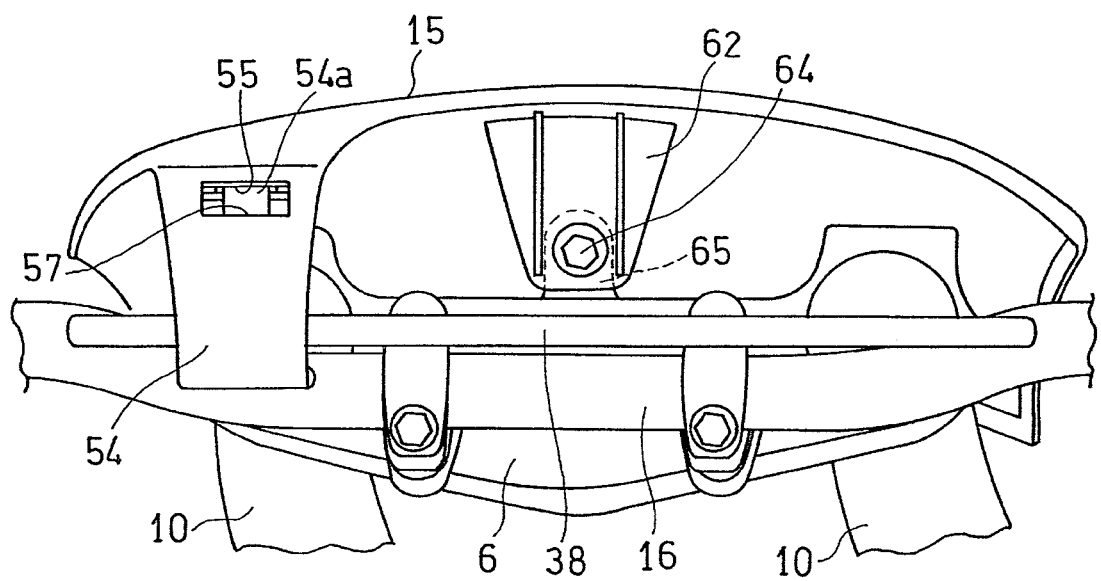
FIG. 9 is a top plan view showing, on an enlarged scale, a connection area between the number plate and an upper bracket.

The number plate mounting portion 52 of the number plate 15 has a rear surface (back surface) which is provided with a mounting piece 62 defined at an upper area of such rear surface intermediate of the widthwise direction of the motorcycle, and an insertion hole 62a is defined in the mounting piece 62 so as to open in the vertical direction. As shown in FIG. 9, the number plate 15 has an upper portion supported by a stay 65 that is formed integrally with the upper bracket 6 through the mounting piece 62 by means of a bolt 64.

Hereinafter, the manner of assembling the front fender 14 and the number plate 15 onto the motorcycle frame structure FR will now be described with particular reference to FIGS. 7 to 9. At the outset, as shown in FIG. 8, bolts 69 are inserted from below into the corresponding bolt insertion holes 50 defined in the front fender 14 and are then threaded into respective threaded holes (not shown), provided in the under bracket 8 best shown in FIG. 1, to thereby fit the front fender 14 to the under bracket 8.

Figure 7:
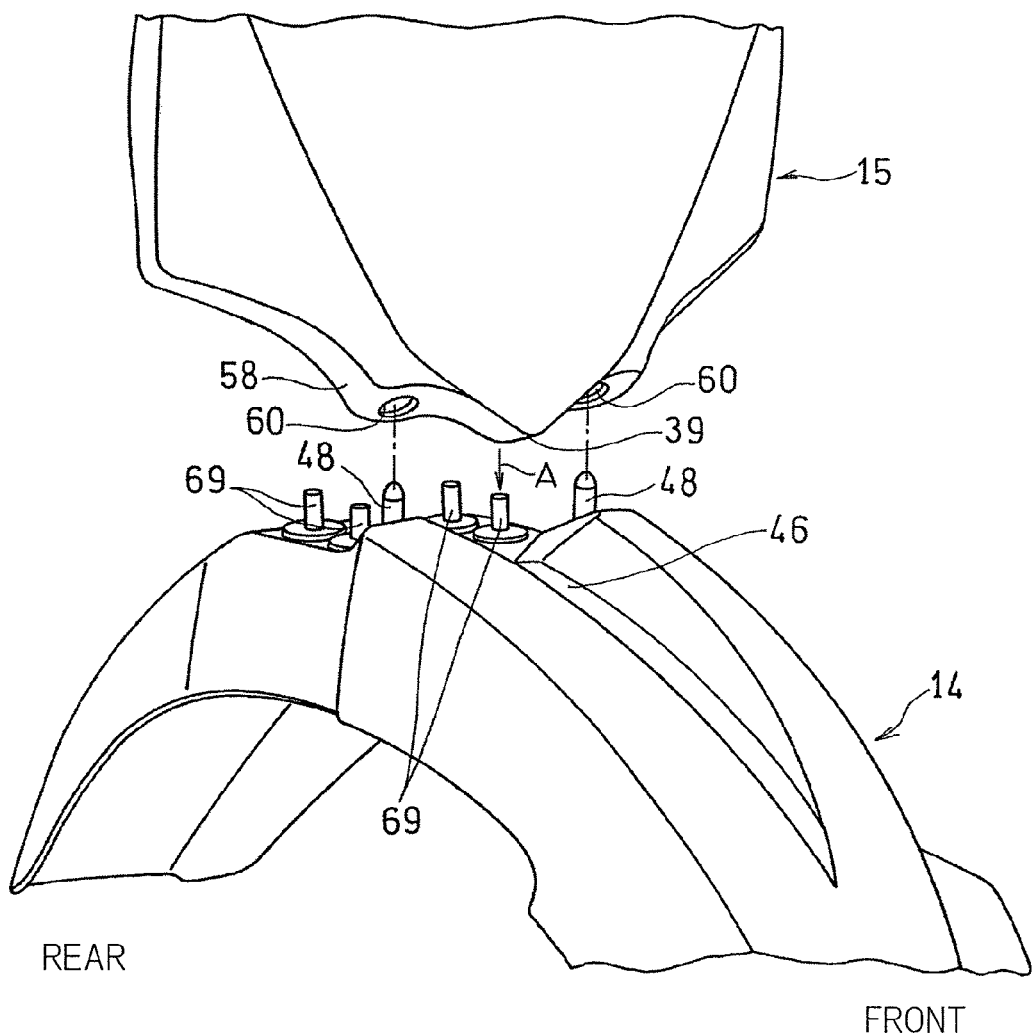
FIG. 7 is a perspective view showing, on an enlarged scale, an engagement area between the front fender and the number plate as viewed from diagonally side.

Thereafter, the number plate 15 shown in FIG. 7 is displaced downwards (in a direction shown by the arrow A) to allow the engagement holes 60 of the number plate 15 to be engaged with the projections 48 in the front fender 14. At this time, the triangular lower end edge 39 of the number plate 15 is engaged in the longitudinal groove 46 of the corresponding triangular sectioned shape and is accordingly guided to a desired position, thus facilitating the engagement of the engagement holes 60 with the corresponding projections 48. In this way, the lower end edge 39 of the number plate 15 is engaged in the longitudinal groove 46 in the front fender 14 and, at the same time, the flange 58 at the lower end edge 39 of the number plate 15 best shown in FIG. 8 is brought into contact with the upper surface of the front fender 14, more specifically the first inclined surface area 44a. In this way, the lower end portion of the number plate 15 is supported in abutment with the front fender 14 and, also, positioning of the number plate 15 is thus accomplished.

Then, as hereinbefore described, the upper portion of the number plate 15 is supported by the upper bracket 6 through the mounting piece 62 by means of the bolt 64 best shown in FIG. 9. Also, as shown in FIG. 8, after the band 54 of the number plate 15 has been engaged with the reinforcement bar 38, the tip end portion 54a of the band 54 is passed through and then engaged in the engagement portion 55.

In the construction hereinabove described, since the projection 48 on the upper surface of the front fender 14 and the engagement hole 60 in the number plate 15 are engaged with each other, no gap is formed between the upper surface of the front fender 14 and the lower end of the number plate 15. Also, since the projection 48, not an engagement hole, is formed in the upper surface of the front fender 14, there is no possibility that muddy water may pass through the front fender 14 upwardly to ingress. In addition, since the lower end edge 39 of the number plate 15 is easily positioned leftwards or rightwards having been guided by the longitudinal groove 46 in the front fender 14, the engagement between the number plate 15 and the front fender 14 is easily accomplished.

Since the longitudinal groove 46 in the front fender 14 shown in FIG. 7 is of the triangular sectional shape and the lower end edge 39 of the number plate 15 is correspondingly shaped triangular, the longitudinal groove 46 in the front fender 14 is easily engaged with the lower end edge 39 of the number plate 15 and the number plate 15 is therefore smoothly guided to the desired position.

Since the flange 58 is formed in the lower end edge 39 of the number plate 15 and extends diagonally rearwardly and downwardly to be connected with the first inclined surface area 44a of the front fender 14, the number plate 15 is brought into surface contact with the front fender 14 and the number plate 15 is therefore stabilized.

Since the projection 48 and the engagement hole 60 are provided in respective pairs on left and right sides, the position of the number plate 15 relative to the front fender 14 is stabilized by means of the engagement at two locations.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the foregoing embodiment, the flange 58 of the number plate 15 and the first inclined surface area 44a of the front fender 14 have been formed by respective surfaces that extends diagonally rearwardly and downwardly and inclined, they may be horizontal surfaces that extend rearwardly.

Accordingly, such changes and modifications are, unless they depart from the scope of the present invention as delivered from the claims annexed hereto, to be construed as included therein.

REFERENCE NUMERALS

12: Front wheel
14: Front fender
15: Number plate
16: Steering handle
39: Lower end edge of the number plate
46: Longitudinal groove
48: Projection
58: Flange
60: Engagement hole

What is claimed is:

1. A motorcycle comprising a front fender, which overhangs a front wheel, and a number plate disposed forwardly of a handlebar, in which:
   a longitudinal groove is formed at a center portion of the front fender with respect to a widthwise direction and recessed to taper downwardly;

the number plate has a lower end edge, at least a portion of the lower end edge being so formed as to represent a tapered shape enough to allow that portion of the lower end edge to engage in;

a projection is provided in an upper surface of the front fender; and an engagement hole engageable with the projection is provided in the number plate.

2. The motorcycle as claimed in claim 1, in which the longitudinal groove in the front fender is of a triangular sectional shape and, in correspondence therewith, the lower end edge of the number plate is triangular in shape.

3. The motorcycle as claimed in claim 1, in which the lower end edge of the number plate is formed with a flange extending rearwardly to be connected with the upper surface of the front fender, and the engagement hole is formed in the flange.

4. The motorcycle as claimed in claim 1, in which the projection and the engagement hole are provided in respective pairs on left and right sides.

\* \* \* \* \*